United States Patent
Emmanuel et al.

(10) Patent No.: US 9,990,822 B2
(45) Date of Patent: Jun. 5, 2018

(54) INTRUDER DETECTION USING A WIRELESS SERVICE MESH NETWORK

(71) Applicant: NETGEAR, INC., San Jose, CA (US)

(72) Inventors: Joseph Amalan Arul Emmanuel, Cupertino, CA (US); Peiman Amini, Mountain View, CA (US)

(73) Assignee: NETGEAR, INC., San Jose, CA (US)

( * ) Notice: Subject to any disclaimer, the term of this patent is extended or adjusted under 35 U.S.C. 154(b) by 0 days. days.

(21) Appl. No.: 15/465,405

(22) Filed: Mar. 21, 2017

(65) Prior Publication Data

US 2018/0102032 A1  Apr. 12, 2018

Related U.S. Application Data

(60) Provisional application No. 62/406,325, filed on Oct. 10, 2016.

(51) Int. Cl.

| | |
|---|---|
| *G08B 13/22* | (2006.01) |
| *H04W 4/02* | (2018.01) |
| *H04W 76/02* | (2009.01) |
| *H04W 16/26* | (2009.01) |
| *H04W 84/18* | (2009.01) |
| *H04W 48/02* | (2009.01) |

(52) U.S. Cl.
CPC .............. *G08B 13/22* (2013.01); *H04W 4/02* (2013.01); *H04W 4/028* (2013.01); *H04W 4/029* (2018.02); *H04W 16/26* (2013.01); *H04W 76/021* (2013.01); *H04W 76/11* (2018.02); *H04W 48/02* (2013.01); *H04W 76/025* (2013.01); *H04W 76/15* (2018.02); *H04W 84/18* (2013.01)

(58) Field of Classification Search
None
See application file for complete search history.

(56) References Cited

U.S. PATENT DOCUMENTS

| | | |
|---|---|---|
| 7,248,574 B2 | 7/2007 | Backes et al. |
| 2007/0142050 A1 | 6/2007 | Handforth et al. |
| 2013/0308470 A1 | 11/2013 | Bevan et al. |
| 2014/0098682 A1 | 4/2014 | Cao et al. |

(Continued)

FOREIGN PATENT DOCUMENTS

WO  2016064641 A1  4/2016

*Primary Examiner* — Leon-Viet Nguyen
(74) *Attorney, Agent, or Firm* — Perkins Coie LLP (57) ABSTRACT

The disclosed teachings relate to intruder detection. Some of the subject matter described herein includes a computer-implemented method for detecting physical movement using a wireless mesh network that provides wireless data communication, the wireless mesh network having a plurality of mesh points, each mesh point having a wireless coverage, the method including compiling a database of known devices based on monitoring unique identifiers of known devices that have previously conducted communication with the wireless mesh network through the plurality of mesh points; upon detecting a physical presence of a subject device within a physical space of the wireless mesh network, determining, based on the database of known devices, whether the physical presence of the subject device belongs to an anomaly; and when the physical presence of the subject device is determined to be an anomaly, causing a security action to be performed.

22 Claims, 9 Drawing Sheets

(56) References Cited

U.S. PATENT DOCUMENTS

| | | |
|---|---|---|
| 2014/0269526 A1* | 9/2014 | Mitola .................. H04L 5/0037 370/329 |
| 2015/0004974 A1 | 1/2015 | Karimi-Cherkandi et al. |
| 2015/0071163 A1* | 3/2015 | Mackie .................... H01Q 9/18 370/315 |
| 2015/0195776 A1 | 7/2015 | Padden et al. |
| 2015/0350228 A1* | 12/2015 | Baxley .................. H04W 12/08 726/23 |
| 2017/0094681 A1 | 3/2017 | Takeda et al. |
| 2017/0164323 A1 | 6/2017 | Markhovsky et al. |

* cited by examiner

FIG. 9

INTRUDER DETECTION USING A WIRELESS SERVICE MESH NETWORK

CROSS-REFERENCE TO RELATED APPLICATION(S)

This application claims priority to U.S. Provisional Patent Application No. 62/406,325, filed on Oct. 10, 2016, entitled "DISTRIBUTED MULTI-BAND WIRELESS NETWORKING SYSTEM," which is hereby incorporated by reference in its entirety.

TECHNICAL FIELD

The disclosed teachings relate to intruder detection using a wireless network, and more particularly to using wireless technology to detect intruders in physical spaces such as rooms, buildings or other areas.

BACKGROUND

Home intrusions are a major concern for many home owners and renters. Some security monitoring systems for detecting home intrusions require purchasing security system equipment that can be expensive to install. For example, security system equipment can include contacts that can be installed on windows and doors. These contacts can be used to determine whether the windows and doors are being opened. However, each window and door in the home needs to have a contact, and each of the contacts might require wiring to a control system of the security monitoring system. This can make installation difficult. In another example, motion control sensors can be installed in rooms of the home to detect unexpected movement. However, many of these motion control sensors might need to be installed high on a wall or close to the ceiling, also resulting in a difficult installation.

By contrast, wireless mesh networks can be easily set up in the home. For example, multiple devices can be grouped together to implement a wireless network (e.g., conforming to one of the Institute of Electrical and Electronics Engineers (IEEE) 802.11 standards implementing a wireless local area network (WLAN)). The multiple devices can be placed in different locations of the home to provide better network coverage than a single device (e.g., a single device providing a router and/or access point). For example, the devices can be merely placed upon tables, shelves, desks, or other furniture.

SUMMARY

Some of the subject matter described herein includes a computer-implemented method for detecting physical movement using a wireless mesh network that provides wireless data communication, the wireless mesh network having a plurality of mesh points, each mesh point having a wireless coverage, the method including compiling a database of known devices based on monitoring unique identifiers (UIDs) of known devices that have previously conducted communication with the wireless mesh network through the plurality of mesh points; upon detecting a physical presence of a subject device within a physical space of the wireless mesh network, determining, based on the database of known devices, whether the physical presence of the subject device belongs to an anomaly; and when the physical presence of the subject device is determined to be an anomaly, causing a security action to be performed.

In some implementations, the database of known devices includes UIDs of known devices, and pattern of known devices.

In some implementations, the pattern of the known devices includes time of presence and estimated locations of the known devices within the wireless mesh network.

In some implementations, the physical presence of the subject device is determined to be an anomaly when data in the database of known devices show that an estimated location of the subject device deviates from the pattern of known devices.

In some implementations, the physical presence of the subject device is determined to be an anomaly when a location of the subject device is within a determined boundary.

In some implementations, the determined boundary is determined by the pattern of known devices or by an administrator of the wireless mesh network.

In some implementations, the physical presence of the subject device is determined to be an anomaly when the historic data show that a timing of the subject device's physical presence deviates from the pattern of known devices.

In some implementations, the physical presence of the subject device is determined to be an anomaly when the subject device has a UID not in the database of known devices.

In some implementations, determining whether the physical presence of the subject device is to be an anomaly is based on a moving window of data samples relating to the physical presence of the subject device over a predetermined period of time.

In some implementations, the physical presence of the subject device is an anomaly if an average value of the moving window varies more than a threshold.

In some implementations, the physical presence of the subject device is detected based on wireless communication prior to association between the wireless mesh network and the subject device.

In some implementations, the wireless communication prior to association contains a UID of the subject device.

In some implementations, the physical presence of the subject device is detected based on signal interference caused by the subject device or by the human body of an intruder with physical possession of the subject device.

In some implementations, the method includes causing a number of mesh points in the wireless mesh network to estimate a location of the subject device based on a proximity between each of the number of mesh points and the subject device.

In some implementations, the method includes determining the proximity between a respective mesh point and the subject device based on one or more of: (1) a round trip time (RTT) in communications between a respective mesh point and the subject device, (2) a time of arrival (TOA) of communications from the subject device to the respective mesh point, or (3) a received signal strength indicator (RSSI) value of communications from the subject device to the respective mesh point.

In some implementations, the method includes determining the proximity between a respective mesh point and the subject device based on whether the subject device is able to successfully communicate with one or more radio modules on the respective mesh point.

In some implementations, the one or more radio modules have different or tunable wireless communication ranges.

In some implementations, the method includes training one or more machine learning models on the known devices during an initial training period.

In some implementations, whether the physical presence of the subject device belongs to an anomaly is determined based on the one or more trained machine learning models.

In some implementations, training the one or more machine learning models comprises establishing a hidden Markov model to model movement of the subject device for determining the anomaly.

In some implementations, the method includes causing, by using a backhaul communication mechanism that is not client-serving, a number of mesh points in the wireless mesh network to estimate a location of the subject device.

In some implementations, the method includes instructing, by using a backhaul communication mechanism that is not client-serving, a number of mesh points in the wireless mesh network to utilize one or more client-serving radio modules that have different or tunable wireless communication ranges for estimating a location of the subject device.

DETAILED DESCRIPTION

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure.

The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication (e.g., a network) between components. The present embodiments are not to be construed as limited to specific examples described herein but rather to include within their scope all embodiments defined by the appended claims.

This disclosure describes devices and techniques for detecting an intruder within a physical space using a wireless mesh network. In one example, a wireless mesh network can be implemented by a system including access points (APs), or satellite nodes, placed within a physical space such as a home. An example of such a wireless mesh network is described in U.S. patent application Ser. No. 15/287,678 to the same applicant herein; the content of which is hereby incorporated by reference in its entirety.

When a device (e.g., a mobile phone) scans, or probes, for available wireless networks within range of the coverage of the wireless mesh network or attempts to connect with the wireless mesh network, this can expose a unique identifier (UID) of the device, for example, a media access control (MAC) address assigned to the device's network interface controller (NIC). Other examples of a unique identifier can include a universally unique identifier (UUID), AID, etc. The system can record the unique identifiers of several devices scanning or connecting with the wireless mesh network to generate a database of known, or recognized, devices. Later, when another device is within range of the wireless mesh network (e.g., scanning or connecting with the wireless mesh network), the database of known devices can be used to determine whether it is recognized as a known device. If not, this can represent an intrusion into the physical space housing the APs, and therefore, a security action can be performed. For example, the homeowner can be alerted via email, text message, etc. that an intrusion into the physical space has been detected using the wireless mesh network.

Additionally, characteristics of the signals between the unrecognized device and one or more of the APs can be used to determine whether there is an intruder in the physical space. For example, the time of the establishment of the communication connection providing the signal, the round trip time (RTT) of data between an AP and the device, receive signal strength indication (RSSI) of the communication connection, etc. can also be used to determine an intrusion into the physical space. Thus, a security system can be provided by a wireless mesh network that can be easily installed. Moreover, the cost of the security system can be reduced because the existing components of the wireless mesh network can be used to detect an intruder.

In more detail, network security is important. Nowadays almost everybody has a phone with them when they move. The phone may be used to detect an intruder on a wireless network, and therefore determine that an intruder has violated (e.g., trespassed into) a physical space such as a home in which the wireless network is deployed. Particularly, intruder detection can be performed by monitoring Wi-Fi and Bluetooth activities using one or more access point (AP) units. The system may monitor probe requests to detect the presence of a new device. If a certain receive signal strength indicator (RSSI) pattern is seen for a unique identifier (UID), such as a new MAC address, the information can be used for intruder detection. Also, certain time of arrival or round trip delay on a new MAC address or AID may be used to detect the intruder. Additionally, indoor localization techniques can also be used to detect an intruder. A UID can include MAC Address, UUID, and/or AID. The UID can be provided in one or more packets received from the devices.

Figure 1:
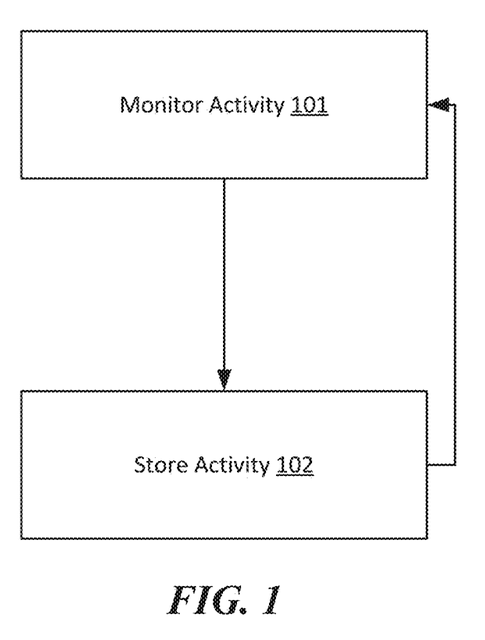
FIG. 1 illustrates a process for storing activity.

FIG. 1 illustrates an example of a process for storing activity. At block 101, activity within the surrounding environment of a wireless network is monitored. Monitoring can include detecting the presence of devices within the coverage of the wireless network, and/or determining changes in characteristics of signals, such as signal strength of signals providing communications between the devices and the APs of the wireless network (e.g., a wireless mesh network having multiple APs). In an embodiment, the one or more AP units can allow the device to connect to the AP unit and the data packets can be monitored for suspicious activity. The AP units can be configured as a mesh network and can be mesh points. The signal strength can be measured over time to determine signal patterns associated with dates and/or times. At block 102, this collected data can be stored. For example, the collected data can be stored in a database accessible by the security system. In some embodiments of block 102, results of monitoring for the presence of user devices in the environment can be stored with associated dates and/or times. In at least one embodiment, monitoring can include tracking an electronic tag. For example, a pet collar can be tagged with an electronic tag, the proximity of the pet to the device can be measured, and the owner can be alerted when the chip passes a specific distance threshold. In some embodiments, the techniques discussed with reference to blocks 101 and 102 can be performed during a "training" or "calibration" phase of the security system using the wireless mesh network. For example, the first few hours, days, or weeks can involve recording the data discussed herein to determine the expected activity within the environment of the physical space in which the wireless mesh network is deployed. This results in a database indicating devices that have previously communicated with the wireless mesh network, and therefore, a listing of known or recognized devices within the coverage of the wireless mesh network. Patterns of activities of those devices (e.g., location in the home, time, movements, etc.) can also be determined. This can also include storing data indicating various characteristics of signals provided to and/or received from the devices, as discussed herein. As discussed later herein, after the training phase, intruders can be detected by comparing data related to currently determined activities within the physical space with the data related to the training phase. In some embodiments, multiple training phases can be performed. That is, the data related to the expected activity can be updated from time-to-time as discussed later herein.

Figure 2:
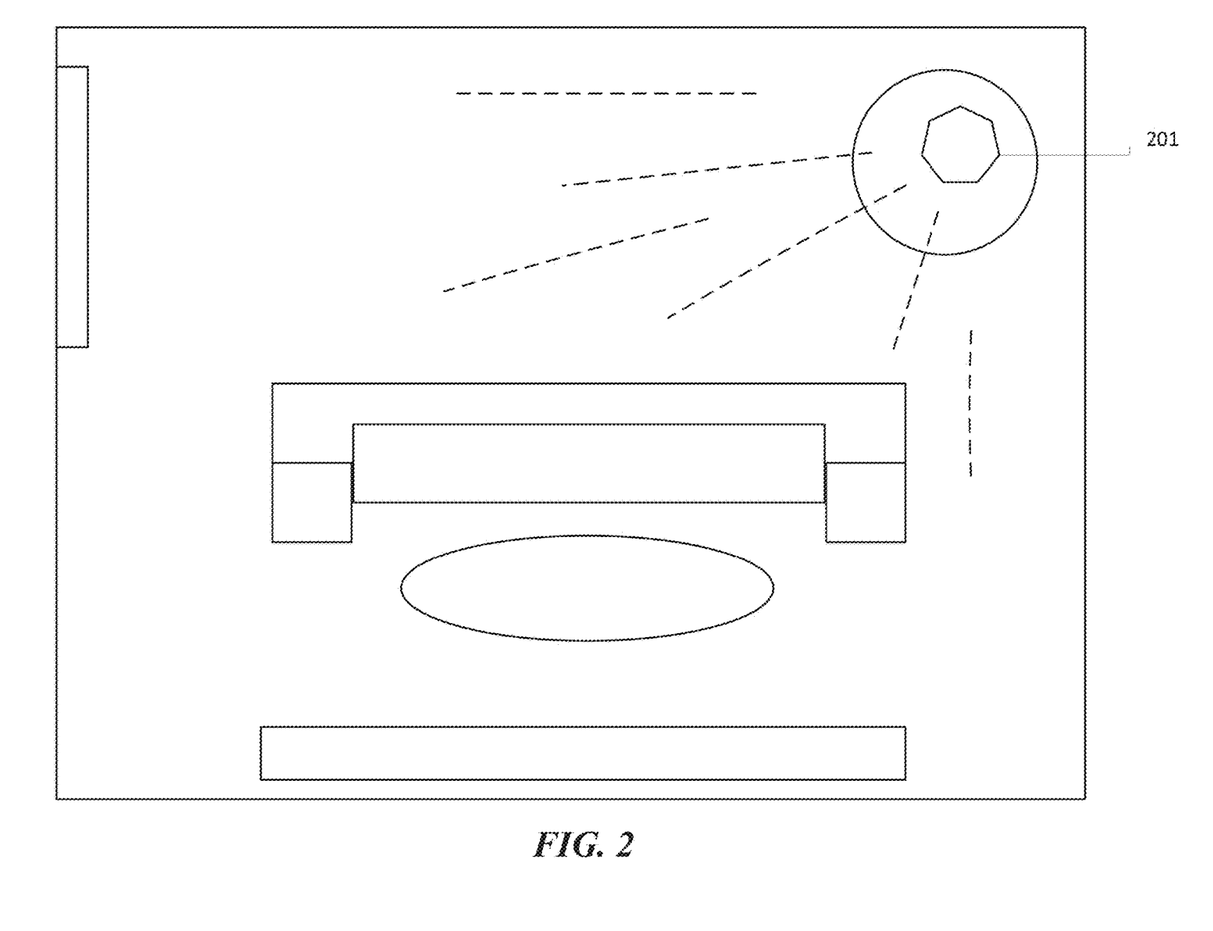
FIG. 2 illustrates an example top view of an access point (AP) unit deployed in a home setting.

FIG. 2 illustrates an example top view of an AP unit in a home setting. A signal is omitted from and/or collected at access point (AP) device 201. In at least one embodiment, the AP unit is a transceiver. In at least one embodiment, multiple AP units, one or more SLAVE units, and/or sensors are being used to collect and/or omit signals. The signals omitted and/or collected can include one or more short range communication technologies such as, Wi-Fi, INSTEON®, Infrared, Wireless USB, Bluetooth®, Skybeam®, Z-Wave®, radio, ZigBee®, Body Area Network, and/or any available wireless technology. In at least one embodiment, the signal omitted and/or collect includes signals of different radio frequencies and/or different ranges on the frequency.

In one example, a device can scan or probe for available wireless networks. As previously discussed, this process can provide the unique identifier of the device to the security system. In some embodiments, the unique identifier is provided before the association process involving the device and AP results in a grant of association in which the device is allowed to use the wireless mesh network (e.g., connected to the Internet, etc.). Thus, devices can be detected before association between the AP of the wireless mesh network and the device. The scanning or probing of the wireless mesh network can include a probe request frame of a WLAN protocol, a GATT profile of a Bluetooth® protocol, etc.

Algorithms such as Hidden Markov Models (HMM) can be used to determine the topology of the room using response times of signals between the APs and devices, time of arrival of signals between the APs and devices, round trip delay (RTD) of signals between the APs and devices, movement of devices between APs, and/or the RSSI of signals between the APs and devices.

In at least one embodiment, the two or more AP units, SLAVE units and/or sensors can communicate via a backhaul and may have an independent wireless physical radio. The AP units, SLAVE units and/or sensors can be configured as a network mesh. In an embodiment, the backhaul can be reserved for AP units (mesh points) to communicate. For example, the backhaul can be a communication link used to provide communications between different APs. Devices (e.g., mobile phones) connect with the wireless mesh network using a fronthaul communication link communicatively coupling the device with an AP. The backhaul and fronthaul communication links can use different frequency bands. The arrangement of backhaul communication links between different APs can represent at topology of the wireless mesh network. In some embodiments, the fronthaul communication links can be used to determine the presence of an intruder, for example, the UID can be received by an AP on a fronthaul communication link.

Figure 3:
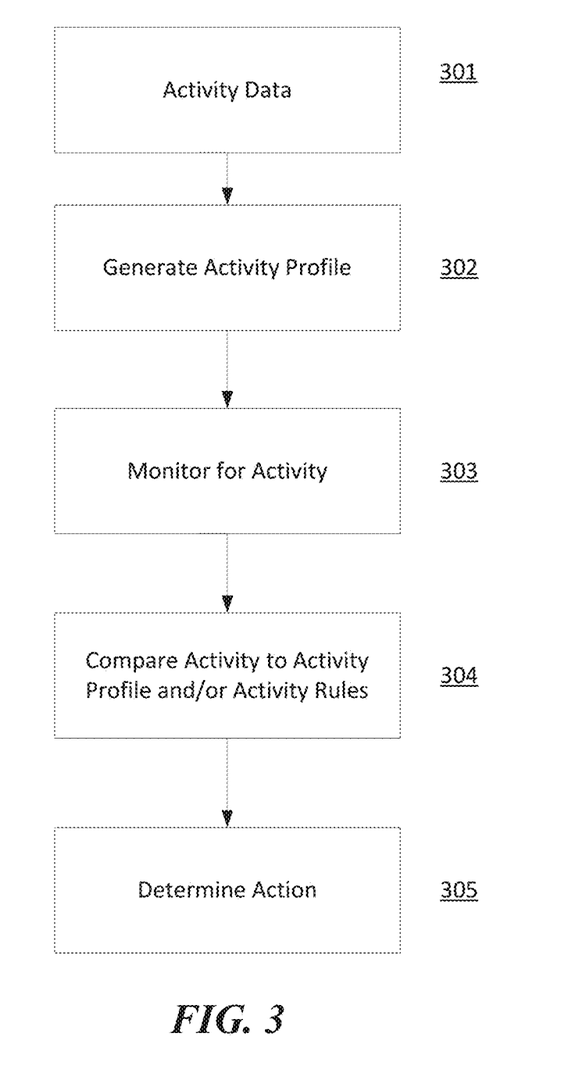
FIG. 3 illustrates an example of intruder detection using a wireless mesh network.

FIG. 3 illustrates an example of intruder detection using a wireless mesh network. At block 301 home activity data is collected and stored as described with reference to FIG. 1. The activity data is then used to generate an activity profile at block 302. In an embodiment, the activity profile can include devices in the home associated with specific days, dates and times. For example, the activity profile can include four detected devices every Monday at 8 p.m. to 11 p.m., which correlate to Monday night football gatherings. The activity profile can therefore be used to determine that on Monday night 8 pm-11 pm unknown devices will enter the home, and therefore, these should not be determined to be intruders. Machine learning can be used to determine the difference between outliers and/or significant events. The four unknown devices can be stored in association with the activity profiles. Devices and/or patterns can be stored in association with activity profiles. Calendar entries can be used to assist the system with identifying the activity. For example, multiple devices entering a home once per year can be determined to be insignificant by the machine learning algorithm or can be determined to be a significant event associated with a holiday party. In an embodiment, external information in conjunction with data can provide context to create an activity profile. The external information can include calendars, emails, social media information, and/or text messages. For example, the security system employing the wireless mesh network for intruder detection can determine that four new unique identifiers (e.g., MAC addresses) representing four unknown devices have probed or connected with the wireless mesh network. The security system can access a calendar (e.g., an online calendar on a cloud service) and determine that the homeowner has a record for a party that will be hosted on that day in a time period in which the four new unique identifiers were detected. As a result, the security system can refrain from sending an alert to the homeowner because these are likely to be invited partygoers rather than intruders.

In at least one embodiment, the determined location of the device can be included in activity data. The location can be determined using probe information such as which AP unit is being probed, and/or the round trip delay (RTD) (e.g., the duration of time it takes for a signal to be sent by an AP and for an acknowledgement of that signal to be received by the AP from the device) and/or RSSI information. The movements derived from this activity can be analyzed to determine movement prints at blocks 302 and/or 304. For example, changes in the RSSI values of signals received from the devices can be correlated with movement because as the device moves within the home, the path to the AP can change, resulting in a different RSSI at different times.

In some embodiments, patterns of these characteristics of the signals (e.g., RTD, or RSSI) can be used to establish a boundary of the physical space for which intruder detection can be implemented. This can be useful because the boundary (or perimeter) of the wireless mesh network (e.g., the range or coverage of the wireless mesh network) might extend farther than the physical space (e.g., the home). During the calibration or training phase as previously discussed, the boundary of the physical space can also be established using machine learning. For example, as the user walks around his or her home with a mobile device, the RSSI of communication connections or signals between the mobile device and the APs can be determined. This can establish a range of RSSI values that can be representative of the mobile device being within the physical space and, therefore, also within the range of coverage of the wireless mesh network. An RSSI value outside of that range can be indicative of a device that is within range of the wireless mesh network, but not within the physical space. Thus, if an RSSI value outside of that range is determined, then this can indicate that someone is outside of the home and might not be an intruder. If the RSSI value is within that range, then this can indicate that someone is inside of the home and, therefore, a security action can be performed. If machine learning algorithms are employed, then the boundary can be adjusted over time. For example, the boundary can be tuned, or adjusted, to be more accurate over time by collecting more data regarding RSSI values, using more devices, gathering information from more locations, etc. In some embodiments, the boundary can be determined as set by the user. For example, during the training or calibration phase, the user can walk around the physical space for which intruder detection should be implemented. The RSSI values during this can be determined in a similar manner to define the boundary.

In one embodiment, the RTD (or RTT) can be used to determine the distance of the device from one or more of the APs. If the RTD decreases, this can mean that the device is getting closer and if the RTD is within a threshold time range, then this can indicate that the device is within a portion of the physical space covered by the wireless mesh network for which intruders should be detected. These techniques can also be used to determine movement and if movement is detected when no device should be moving (e.g., devices at 2 a.m. should be expected to be resting in a single place while the homeowner is asleep), then this can indicate an intruder is in the home. In some embodiments, these measurements can be averaged out with a moving window, or moving average, and if that value is within a threshold value range or outside of the threshold value range, then this can indicate that the physical presence of that detected device is an anomaly (e.g., an intruder).

In at least one embodiment, abnormal movement patterns of multiple devices can be analyzed. Known user movements can be identified and associated with activity rules. The system may determine the normal movement of a known individual and when an unknown guest and/or device enters the home, the movement of the known individual can be analyzed to determine if the movement of the known user changes. For example, during a home invasion, the movement of the known user or users may change immediately after the unknown guest enters the home. In another example, an intruder can be detected by determining that a device with an unrecognized unique identifier has probed the wireless mesh network late in the evening. If at that time the homeowner has a device with a unique identifier that is usually placed in a bedroom (e.g., on a nightstand) but it is now moving towards another room, then this might indicate that the homeowner is reacting to an intruder in the home. Thus, historical data representing how a device is usually operated within the physical space can be determined and if current activity associated with that device deviates from the historical data upon detection of an unknown device in the physical space, various actions as disclosed herein can be performed. The rule may trigger an action similar to the actions described in blocks 304 and 305 below.

In an embodiment, the activity can be collected at a specified interval such as set amount of minutes, seconds, and/or hours. In some embodiments, the collected activity can be grouped to reduce storing unnecessary data and/or increase data processing times. Long periods of time may pass during which the activity information will remain unchanged. For example, the workweek day activity in the home may remain the same for 8 hours because no one is home. The identical and/or nearly identical information can be grouped to one activity record with the associated time period.

In at least one embodiment, the activity profile can be manually configured by the user to identify the devices and/or individuals that are expected in the home at the associated dates, days and/or times. A device associated with a cleaning person can be set to be expected in the home on Friday mornings. As a result, when the cleaning person enters the home on Friday morning and an unknown device is recognized (e.g., the unique identifier is not recognized), a security alert can be avoided. This can reduce the number of false positives of intruder detections. When the device information is not known, the activity profile can be manually set up to expect unknown devices during specific dates, days and/or times.

The activity profile can include determining the movements and/or masses in the home by tracking the change of RSSI and/or RTD of signals between devices and APs. One or more machine learning algorithms may determine the patterns of the collected data and build the activity profile. In an embodiment, a house guest with an uncharged device can be detected by the movement in the home. The monitored activity data can include a timestamp. The time stamp associated with collected data can aid in determining the number of individuals in the home. For example, the determination can be made using machine learning algorithms to distinguish whether the detection of a mass next to the couch is the same mass that was detected by the dining room table two minutes prior. The activity information gathered from probing the guest device can be used in combination with the activity collected based patterns which detects masses to build activity profiles, trigger rules, and/or identify appropriate actions. The system can recognize the pattern of movement of devices which may belong to an intruder. The movements can be analyzed to determine movement prints. Different activity profiles, based on patterns, can be learned over different times of the day. For example, between the hours of 1:00 a.m. to 5:00 a.m., this pattern may be different than 4:00 p.m. to 8:00 p.m.

The activity profiles can be built over time by collecting activity information. In an embodiment, an initial setup can be used to train the method and/or system using collected activity of block 301. For example, as previously discussed, during the first few hours or few days, the system may be trained to determine the known device at home. The system may also learn the UIDs such as the MAC address of neighbor devices (e.g., devices in a neighboring house that is within the coverage of the wireless mesh network) and other devices that are regularly within the range of the coverage of the wireless mesh network. For example, devices of delivery drivers dropping off packages at the door of the home can be determined and indicated as known devices. After the initial configuration the system may start sending alerts that an unknown device is identified and is deemed suspicious, representing a potential intruder in the home. The home can include any environment within range or coverage of the wireless mesh network of the system.

At block 303 the data continues to monitor for activity including changes in signal RSSI and/or RTD, wireless connectivity information, probe information from wireless devices, and/or information from electronic tags. The activity data collected at block 303 may continuously be stored and used to update the activity profile as described in FIG. 2 and blocks 301 and 302. Once the activity profile is built it can constantly be updated with the most relevant information and using machine learning algorithms.

In at least one embodiment at block 304, the identity of that guest can be determined using historical data of its previous visits by comparing the mass of the guest calculated using the signal RSSI and/or RTD to the mass associated with previous guests having set devices. For example, a cleaning person having a mass of 62 kilograms (kg) may enter a home without the mobile device and based on the historical information, that person's mass of approximately 60 kg allows for derivation of the previous visit information and the devices previously associated with that mass. The speed of movement can also be derived using the change in RSSI and/or RTD signal as the guest moves through the home. Similar to the example above, the determined mass of the guest and the speed of the movement can be used to match historical data.

In an embodiment, the physical presence of a device within the home can be detected based on signal interference caused by the device or body carrying the device. For example, the security system can measure interference of signals provided to and/or from the devices.

The block at 304 can include determining abnormal behavior. Determining abnormal behavior can include detecting the electronically tagged item leaving the AP range. For example, according to the activity profile the electronically tagged dog collar only leaves the AP range when accompanied by a mobile device or a mass over 50 kg. The comparison can determine that an abnormal event is occurring when the electronically tagged dog collar leaves the AP range unaccompanied. Additionally, the abnormal events of adults, children, and/or pets can be detected using the RSSI and/or RTD. The activity profile can ascertain that masses under 30 kg do not leave the AP range unaccompanied without masses over 50 kg and can determine that an abnormal event is occurring when the accompanying condition fails to be met. In an embodiment, external information in conjunction with data to provide context to determine whether the behavior is abnormal. The external information can include calendars, emails, social media information, and/or text messages.

In an embodiment, activity rules can be configured by the user. For example, although the system may not be able to determine that a homecare attendant spending time next to the safe is abnormal, the user can configure locations/areas in the home as being associated with specific rules. For example, a rule can be set to begin video recording once a guest enters a specific space in the home. The locations in the home can be marked by information learned from the monitored activity such as shown in FIG. 2, and/or can be identified using sensors and/or receivers. The size, topology and/or blueprint of the home can be determined using triangulation techniques. In at least one embodiment, triangulation is used to determine the location of a guest.

In an embodiment, block 305 determines appropriate action based on the results of block 304. The action based on block 304 can include action rules set by default settings, configured by the user, and/or configured by artificial intelligence. The appropriate actions can include notifying a homeowner or other user of the wireless mesh network that an intrusion into the home has occurred. Notifications can include phone app notification, audio alarm, lighting alarm, an alarm, a notification, a text message, a phone call, an email, log, and/or turning on and/or off connected devices. The action may include an initiation of a video and/or audio recording using in home cameras when an intruder is detected. For example, home cameras that are connected with the wireless mesh network can be turned on or instructed to start recording by the security system upon the determination to take appropriate action. Connected devices can include lights, heaters, air-conditioners, modems, routers, televisions, cameras, stoves, smart plugs, garage doors, electronic locks and/or other devices having wireless capabilities.

The action rules can include actions based on the determination of abnormal and/or normal activities at block 304. The normal activities that may result in an action can include the detection of a family member entering a house. The action associated with the family member entering the house can include turning the living room light on/off and turning on/adjusting the air conditioner. The adjusting air-conditioners and/or heaters can lower the electricity bill by triggering an off and/or low power setting when the house is empty.

The determined action can also assist as preemptive security measures. The preemptive security measures can include turning off the stove and/or closing the garage door when no home activity is detected and the home is determined to be empty.

In at least one embodiment, aggregate monitored activity can be used to compare a profile and/or activity rules at block 304. For example, no activity in the home for a set period of time can trigger an action associated with home being empty.

User set action rules can include notifications when a specific activity occurs. A parent can set a rule while on vacation and a child is left home alone that triggers a notification action in response to the detection of multiple visitors. Similarly, the user can configure the rules to trigger a text message when an unknown device enters a home at a specified day and time.

In at least one embodiment, the user can configure the rules to determine a threat level associated with the activity and provide notification according to the threat level. In one example, a user can configure the activity profile associated with a vacation and to notify the user about all activity in the home during that time. The cleaning person may enter the home while the user is on vacation and although the activity profile associated with that specific Friday indicates the user being away, an alternative activity profile exists indicating that a cleaning person is expected Friday morning. In this example, it can be determined that the threat level is low and may be set to trigger an email to the user. Whereas an unknown device entering the home during the vacation period may trigger a high threat level which may trigger a phone call, text message and/or email to the user and/or the designated receiver. The threat level can be configured by the user, set by default, determined by an algorithm and/or artificial intelligence. The threat level determination can include comparing the set activity profile to other activity profiles and historical data. Furthermore, the threat level determination can be synchronized to incorporate a calendar, emails, social media information, and/or text messages.

In at least one embodiment, activity data determined to not require an action can be erased, and/or stored in an external location for a set period of time. Similarly, historic activity data can be preserved for a set period of time, erased after a defined period of time, and/or sent to a remote location for storage.

Figure 4:
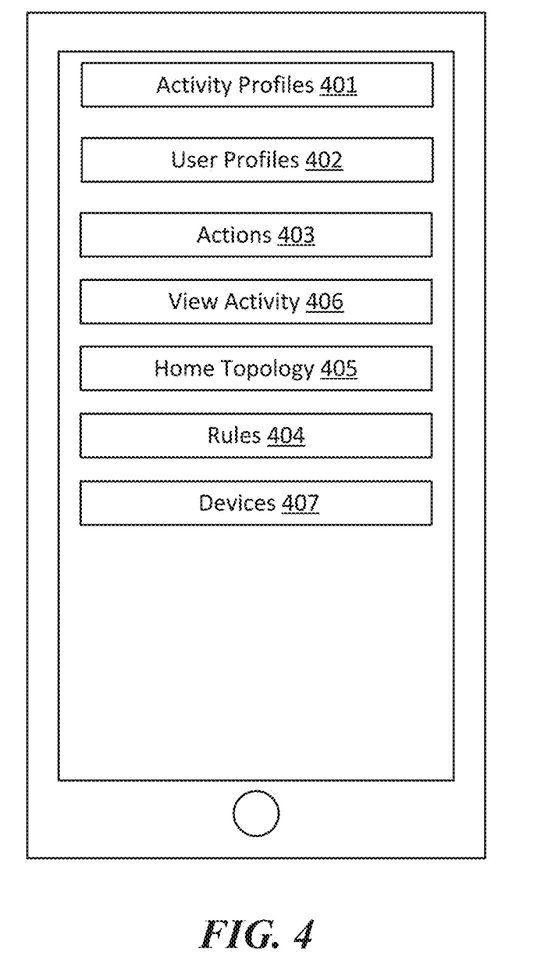
FIG. 4 illustrates an example of an administrative console.

In an embodiment, an administrative console, FIG. 4, allows the user to configure the settings. Configurable settings include manually editing and/or creating activity profiles 401, configuring user profiles 402, setting actions 403 associated with determinations based on the monitored activity 406 and/or rules 404, viewing and/or editing the home topology 405 which can be used for recognized devices 407. The administrative console can be configured for accessibility only when the device is in the home network. In an embodiment, the administrative console can be configured for accessibility from outside the home network. Furthermore, the administrative console can be in the form of a dedicated managing device, a smart home appliance, an app on a mobile device, an application from a computer, and/or a web based application. In at least one embodiment, the administrator can search for dates and times of when a device and/or a specific pattern was found in the home.

In at least one embodiment, a user can add devices to the rules. Devices can include lights, heaters, air-conditioners, modems, routers, televisions, cameras, stoves, smart plugs, garage doors, electronic locks, and/or other devices having wireless capabilities. Furthermore in an embodiment, the rules associated with devices can include an action to operate the devices such as "dim the lights," "raise the AC to 74 degrees," and/or "close garage door." In an embodiment, the AP unit can drop the range of the Wi-Fi and/or Bluetooth when the home is determined to be empty.

At least one embodiment allows the user to configure the known devices and associate the devices with metadata, user profiles, rules and/or activity profiles, Generic Attribute (GATT) profiles, MAC address, UUID, AID and/or other device information which known by the AP can be used to identify devices.

The administrative console can include the functionality of the user to view the derived home topology. Based on the RSSI and/or RTD measurements, one or more AP devices can determine a home topology as seen in FIG. 2. In at least one embodiment, based on the RSSI and/or RTD measurements, one or more AP devices and one or more sensors can determine a home topology.

The view activity setting, as seen in FIG. 4, can allow the user to tag activities with identifying information. The activities setting can allow a user to identify activities in the home as associated with activity profiles, user profiles, a category, a calendar entry, and/or a suspicious activity for further review.

In at least one embodiment, the user can turn on/off the intrusion detection feature, set the feature for manual, and/or automatic configuration.

Figure 5:
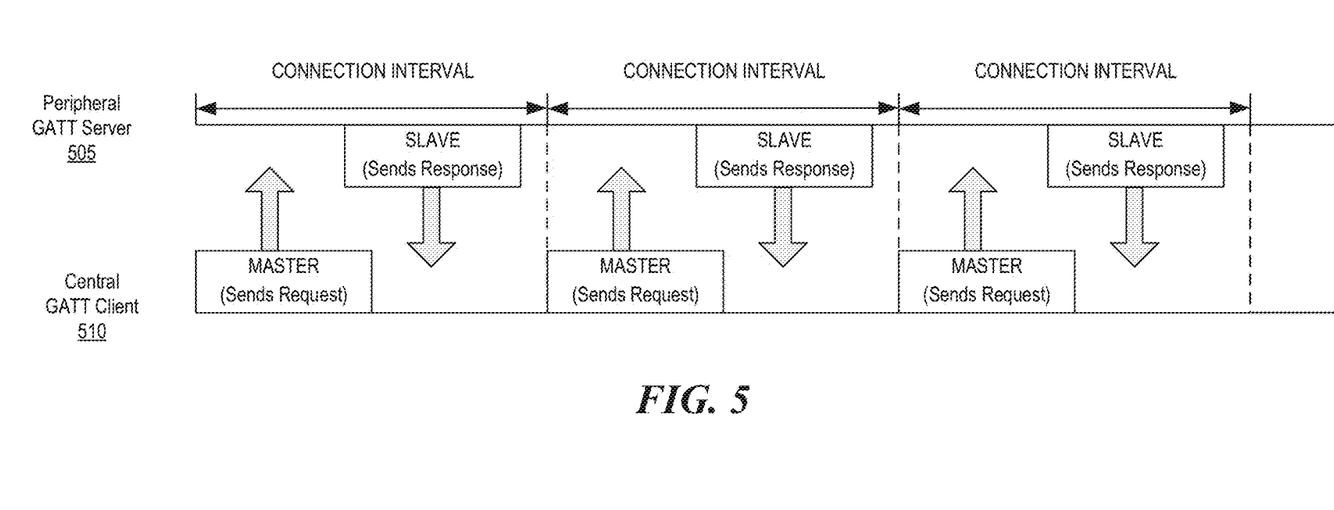
FIG. 5 illustrates an example of communication between Generic Attribute Profile (GATT) servers and clients.

In at least one embodiment, the GATT profile can be used for intruder detection. FIG. 5 shows the communication between GATT server 505 and client 510. UIDS such as GATT MAC address, AID, and/or UUID (universally unique identifier) can be used to detect devices in the home. The system may use the localization techniques available on Wi-Fi and Bluetooth for intruder detection if a device is known or the system can localize a new unknown device. The system can use long dedicated backhaul to do the coordination between units as a detection mechanism for intruders. The system can use Bluetooth packets that can be sent to a new device to detect an intruder. The system can use pre-association Wi-Fi for intruder detection and can combine all methods available for pre-association of Wi-Fi and for new Bluetooth devices to provide robust intruder detection. The system can use higher frequencies such as 28 GHz, 60 GHz for more accurate radar type intruder detection.

Figure 6:
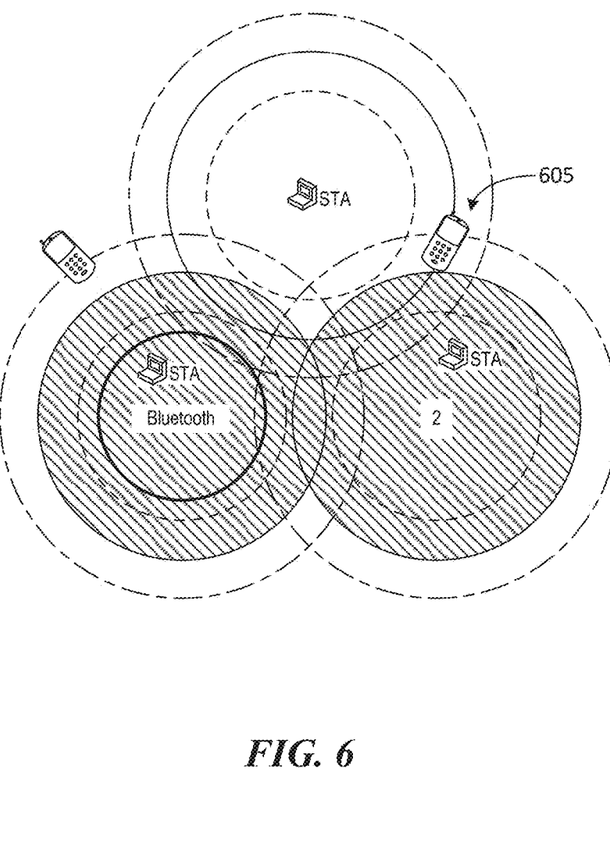
FIG. 6 illustrates an example of a detected intruder device.

The activity profiles can be constantly updated and become more accurate over time by tracking activity patterns and learning from them using information available to the AP such as probing information, RSSI and RTD of Bluetooth, and/or Wi-Fi. The pattern can be related to, e.g., RSSI, time of arrival, phase of arrival, etc. FIG. 6 shows an example of a detected intruder device 605. Activities and activity patterns can be associated with activity profiles.

Figure 7:
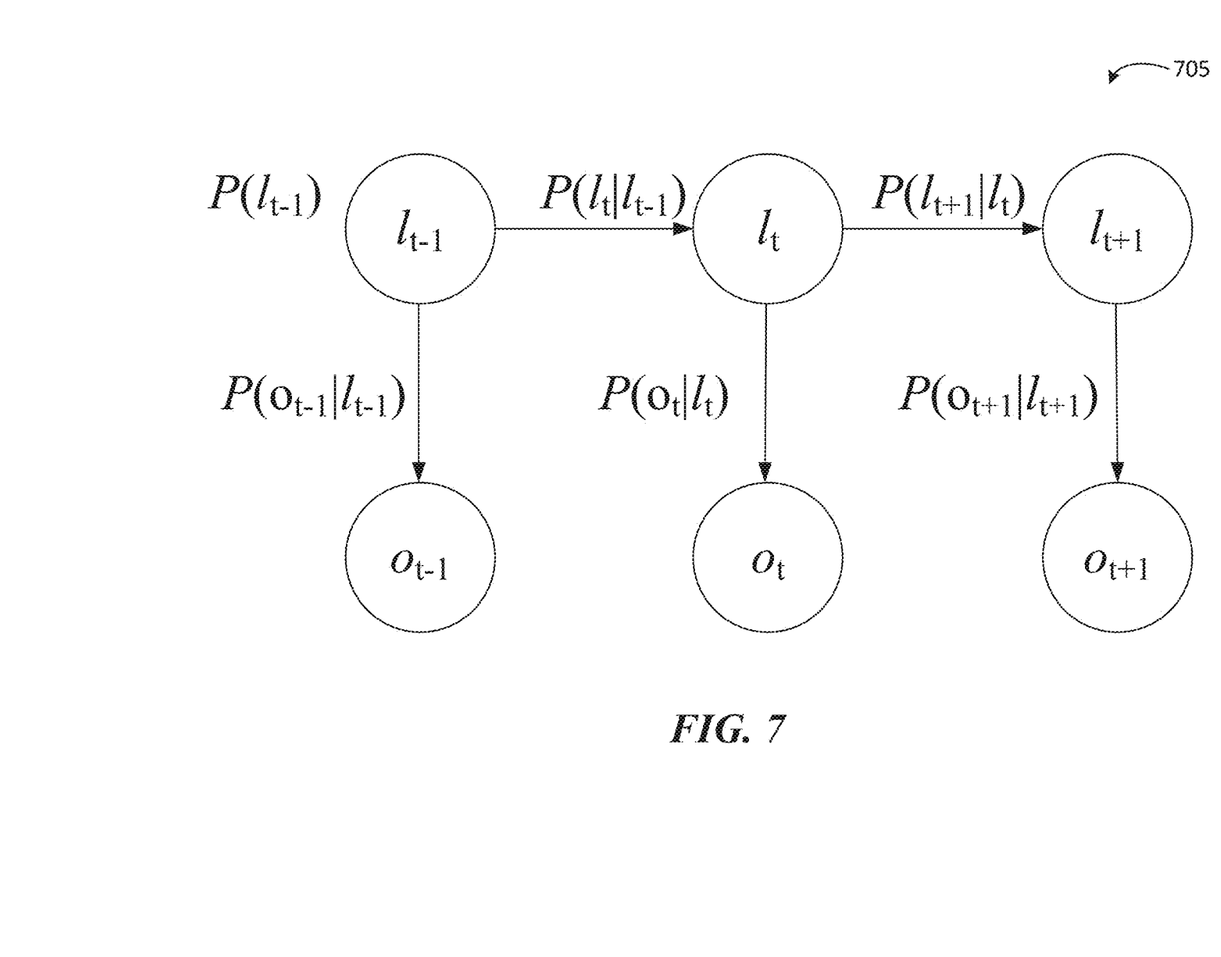
FIG. 7 illustrates an example of a use of a Hidden Markov Model (HMM) to model movement of devices and/or masses.

FIG. 7 illustrates the use of Hidden Markov Model (HMM) to model movement of devices and/or masses. First order HMM may be used to model movement in and out of house or different locations. In at least one embodiment, HMM is used for modeling movement. "Lt" of FIG. 7 can designate the different part of a property and the "Ot" can be RSSI, time of arrival and/or round trip time.

Figure 8:
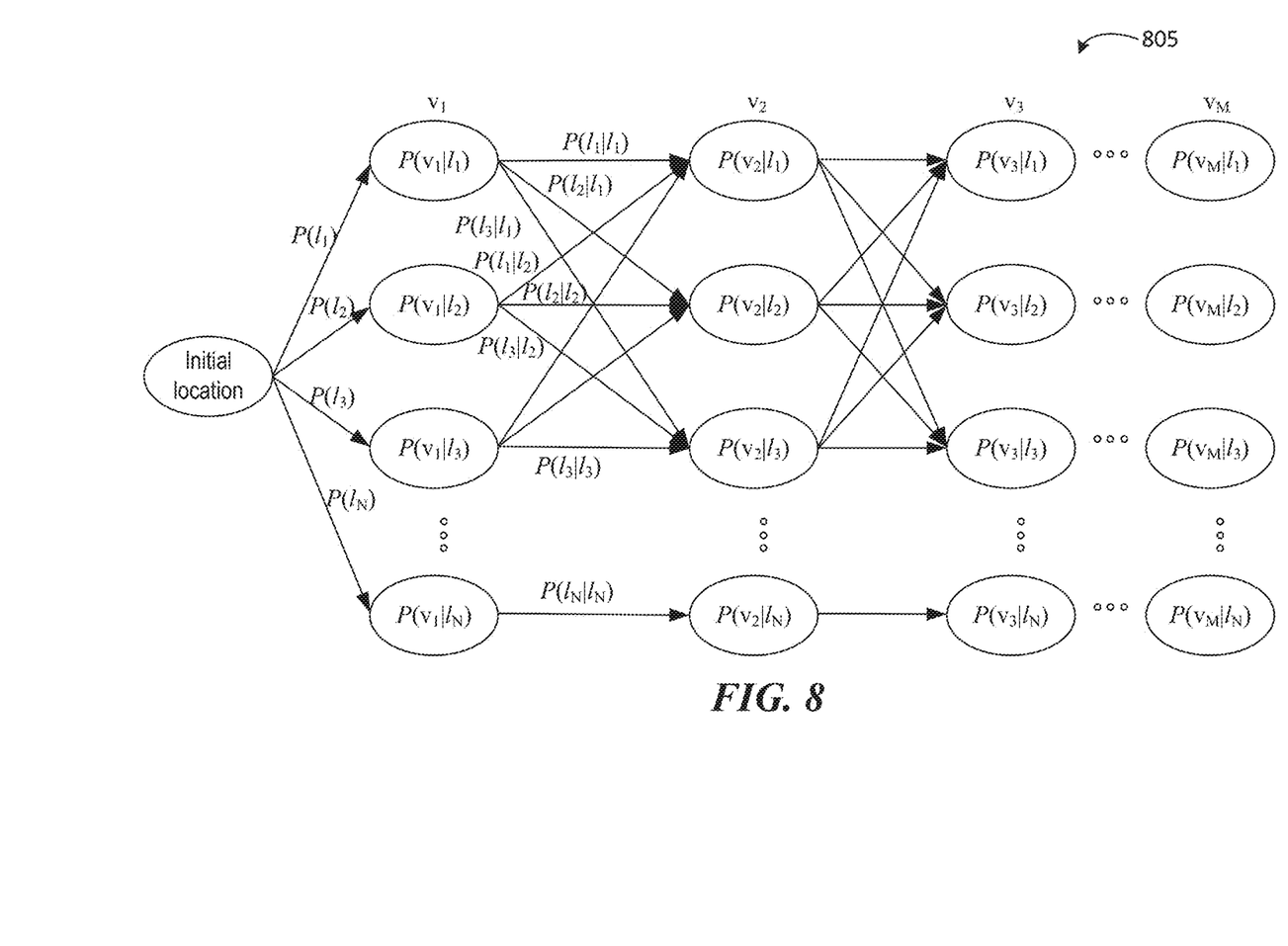
FIG. 8 illustrates an example of a use of the HMM for coordination and time measurements.

The backhaul can be used for coordination and time measurements. FIG. 8 shows a HMM model 805 for coordination and time measurements. For example, given a set of RSSI variation trends, V=fv1, v2, . . . , vM and a settled HMM, the hidden location sequence L=fl1, l2, . . . , l_N can be estimated by employing the Viterbi algorithm.

Figure 9:
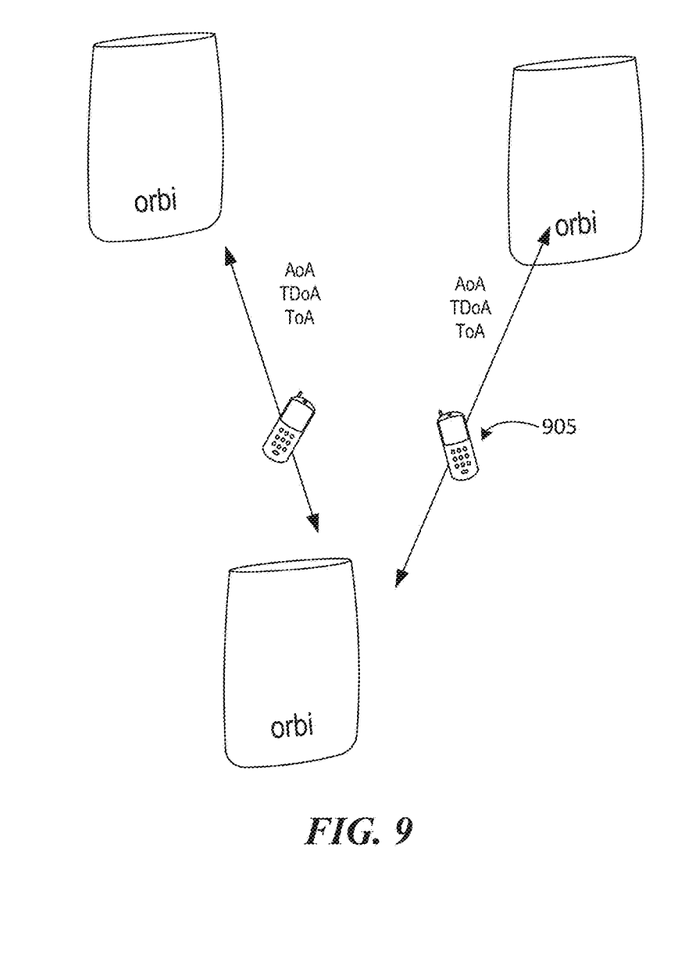
FIG. 9 illustrates an example of intruder devices that are between units of a wireless mesh network.

In at least one embodiment, activity can include data packets between units of the system that may be used to detect an intruder device moving between the units. FIG. 9 shows intruder devices 905 that are between the units of the system. In an embodiment, the AP can allow an unknown device to connect to the AP unit and the data packets can be monitored for suspicious activity. The unknown device can also be monitored for movement between AP units.

Aspects of the disclosed embodiments may be described in terms of algorithms and symbolic representations of operations on data bits stored in memory. For example, instructions for any of the techniques disclosed herein can be stored in non-transitory memory and a processor or other circuitry can execute the instructions to perform the techniques. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

In some embodiments, the APs can include one or more radios. For example, different frequency bands can be used for communication signals by using different radios.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the concepts disclosed herein. Thus, the description is to be regarded as illustrative instead of limiting.

What is claimed is:

1. A computer-implemented method for detecting physical movement using a wireless mesh network, the wireless mesh network having a plurality of mesh points, each mesh point having a wireless coverage, wherein the wireless mesh network includes a fronthaul that provides wireless data communication to clients, and a backhaul that provides communication of management functions among the plurality of mesh points, the method comprising:
compiling a database of known devices based on monitoring unique identifiers (UIDs) of known devices that have previously conducted communication with the wireless mesh network through the plurality of mesh points;
coordinating, via the backhaul, the mesh points to utilize one or more of the mesh points to perform detection of a physical presence of devices within the wireless mesh network, wherein the detection comprises utilizing a difference in wireless network circuitry of the one or more mesh points that provides the fronthaul to estimate an existence of an anomalous device within the wireless mesh network;
upon detecting a physical presence of a subject device within a physical space of the wireless mesh network, determining, based on the database of known devices, whether the physical presence of the subject device belongs to an anomaly; and
when the physical presence of the subject device is determined to be an anomaly, causing a security action to be performed.

2. The method of claim 1, wherein the database of known devices includes UIDs of known devices, and pattern of known devices.

3. The method of claim 2, wherein the pattern of the known devices includes time of presence and estimated locations of the known devices within the wireless mesh network.

4. The method of claim 1, wherein the physical presence of the subject device is determined to be an anomaly when data in the database of known devices show that an estimated location of the subject device deviates from a pattern of known devices.

5. The method of claim 1, wherein the physical presence of the subject device is determined to be an anomaly when a location of the subject device is within a determined boundary.

6. The method of claim 5, wherein determined boundary is determined by a pattern of known devices or by an administrator of the wireless mesh network.

7. The method of claim 1, wherein the physical presence of the subject device is determined to be an anomaly when historic data show that a timing of the subject device's physical presence deviates from a pattern of known devices.

8. The method of claim 1, wherein the physical presence of the subject device is determined to be an anomaly when the subject device has a UID not in the database of known devices.

9. The method of claim 1, wherein determining whether the physical presence of the subject device is to be an anomaly is based on a window of data samples relating to the physical presence of the subject device over a predetermined period of time.

10. The method of claim 9, wherein the physical presence of the subject device is an anomaly if an average value of the window varies more than a threshold.

11. The method of claim 1, wherein the physical presence of the subject device is detected based on wireless communication prior to association between the wireless mesh network and the subject device.

12. The method of claim 11, wherein the wireless communication prior to association contains a UID of the subject device.

13. The method of claim 1, wherein the physical presence of the subject device is detected based on signal interference caused by the subject device or by the human body of an intruder with physical possession of the subject device.

14. The method of claim 1, further comprising:
causing a number of mesh points in the wireless mesh network to estimate a location of the subject device based on a proximity between each of the number of mesh points and the subject device.

15. The method of claim 14, further comprising:
determining the proximity between a respective mesh point and the subject device based on one or more of: (1) a round trip time (RTT) in communications between a respective mesh point and the subject device, (2) a time of arrival (TOA) of communications from the subject device to the respective mesh point, or (3) a received signal strength indicator (RSSI) value of communications from the subject device to the respective mesh point.

16. The method of claim 14, further comprising:
determining the proximity between a respective mesh point and the subject device based on whether the subject device is able to successfully communicate with one or more radio modules on the respective mesh point.

17. The method of claim 16, wherein the one or more radio modules have different or tunable wireless communication ranges.

18. The method of claim 1, further comprising:
training one or more machine learning models on the known devices during an initial training period.

19. The method of claim 18, wherein whether the physical presence of the subject device belongs to an anomaly is determined based on the one or more trained machine learning models.

20. The method of claim 18, wherein training the one or more machine learning models comprises establishing a hidden Markov model to model movement of the subject device for determining the anomaly.

21. The method of claim 1, further comprising:
causing, by using a backhaul communication mechanism that is not client-serving, a number of mesh points in the wireless mesh network to estimate a location of the subject device.

22. The method of claim 1, further comprising:
instructing, by using a backhaul communication mechanism that is not client-serving, a number of mesh points in the wireless mesh network to utilize one or more client-serving radio modules that have different or tunable wireless communication ranges for estimating a location of the subject device.

* * * * *